(12) United States Patent
Poon et al.

(10) Patent No.: US 10,514,503 B2
(45) Date of Patent: Dec. 24, 2019

(54) SYSTEM AND METHOD FOR MANUFACTURING A SEMICONDUCTOR JUNCTION

(71) Applicants: Joyce Kai See Poon, Toronto (CA); Zheng Yong, Toronto (CA); Wesley David Sacher, Mississauga (CA)

(72) Inventors: Joyce Kai See Poon, Toronto (CA); Zheng Yong, Toronto (CA); Wesley David Sacher, Mississauga (CA)

(73) Assignee: The Governing Council of the University of Toronto, Toronto (CA)

( * ) Notice: Subject to any disclaimer, the term of this patent is extended or adjusted under 35 U.S.C. 154(b) by 15 days.

(21) Appl. No.: 15/331,043

(22) Filed: Oct. 21, 2016

(65) Prior Publication Data

US 2017/0254955 A1    Sep. 7, 2017

Related U.S. Application Data

(60) Provisional application No. 62/303,825, filed on Mar. 4, 2016.

(51) Int. Cl.
*G02B 6/134*    (2006.01)
*G02F 1/025*    (2006.01)
(Continued)

(52) U.S. Cl.
CPC ........... *G02B 6/1347* (2013.01); *G02F 1/025* (2013.01); *G02F 1/2257* (2013.01); *G02F 2001/212* (2013.01)

(58) Field of Classification Search
CPC combination set(s) only.
See application file for complete search history.

(56) References Cited

U.S. PATENT DOCUMENTS 6,298,177 B1    10/2001 House
2004/0208454 A1    10/2004 Montgomery et al.
(Continued)

FOREIGN PATENT DOCUMENTS

CN    1764863 A    4/2006
CN    101622570 A    1/2010
CN    103226252 A    7/2013

OTHER PUBLICATIONS

International Search Report dated Mar. 3, 2017 for corresponding International Application No. PCT/IB2016/057079 filed Nov. 23, 2016.
(Continued)

*Primary Examiner* — Ratisha Mehta

(57) ABSTRACT

A method of fabricating a P-N junction in a semiconductor structure, e.g. silicon (Si) structure, is presented. The method may include several implantation steps performed at a single implantation angle with respect to the Si structure. In a first implantation step, a first dopant species is implanted over a first portion of the Si structure including a first edge of the Si structure. In a second implantation step, a second dopant species is implanted over a second portion of the Si structure including a second edge of the Si structure opposed to the first edge but excluding the first edge. The first portion and the second portion may overlap in a central portion of the Si structure between the first edge and the second edge, such that the second dopant species may be implanted below the first dopant species. In a third implantation step, the second dopant species is implanted over the second portion of the Si structure including the second edge of the Si structure opposed to the first edge but excluding the first edge, such that the second dopant species is implanted above the first dopant species.

20 Claims, 13 Drawing Sheets

(51) Int. Cl.
*G02F 1/225* (2006.01)
*G02F 1/21* (2006.01)

(56) References Cited

U.S. PATENT DOCUMENTS

| | | |
|---|---|---|
| 2008/0212913 A1 | 9/2008 | Gill et al. |
| 2011/0101298 A1* | 5/2011 | Tang ........................ H01L 21/22 257/5 |
| 2013/0188902 A1 | 7/2013 | Gardes et al. |
| 2014/0341497 A1 | 11/2014 | Liu et al. |
| 2016/0313577 A1* | 10/2016 | Sun ........................ G02F 1/025 |

OTHER PUBLICATIONS

T. Cao et al., "Design of a siljcon Mach-Zehnder modulator with U-type PN junction," Applied Optics vol. 52 No. 24 p. 5941 (2013).
Yang Liu et al. "Ultra-responsive phase shifters for depletion mode silicon modulators," J. Lightwave Technology, vol. 31 No. 23, 2013.

* cited by examiner

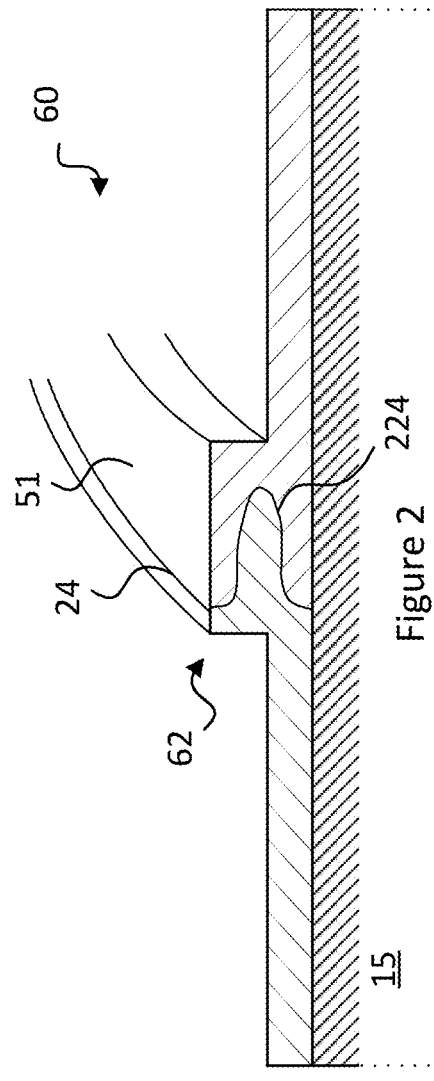
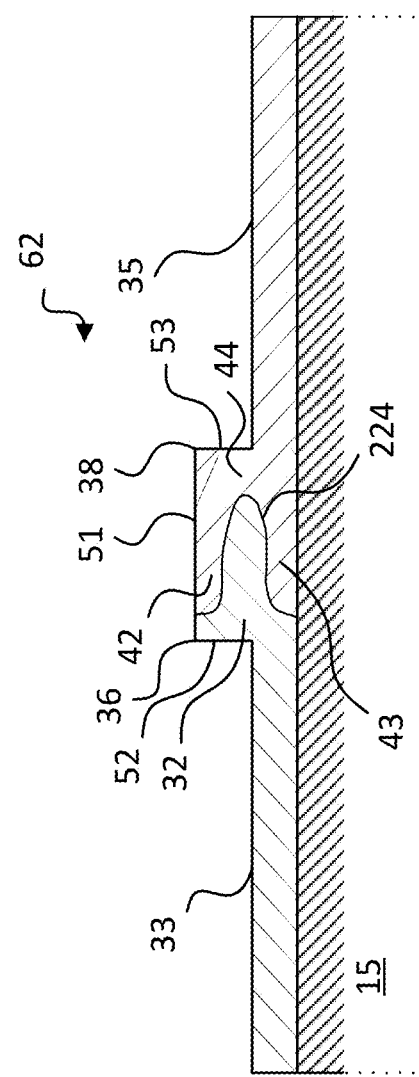

SYSTEM AND METHOD FOR MANUFACTURING A SEMICONDUCTOR JUNCTION

REFERENCE TO RELATED APPLICATIONS

The present application claims priority from U.S. Provisional Patent Application No. 62/303,825, filed on 4 Mar. 2016 and incorporated herein by reference in its entirety.

TECHNICAL FIELD

The present disclosure relates generally to semiconductors. In particular, the disclosure relates to manufacturing semiconductor structures, such as silicon photonic devices.

BACKGROUND

Modern semiconductor processes enable manufacturing of semiconductor structures having complex geometric features. Electrical and optical properties across the geometrical features, may be engineered in accordance with requirements of particular applications.

By way of an example, a P-N junction that exhibits a U-shaped cross-sectional profile may be manufactured across an optical waveguide. The U-shaped structure has one dopant as the U, and another dopant encroaching at a center of the U. A U-shaped P-N junction may be used, for instance, to improve the performance of in a silicon-based Mach Zehnder modulator. The U-shaped P-N junction may extend across the surface of the silicon substrate to form a complex structure.

Prior techniques to create such a structure rely on introducing dopants in a series of application steps, at an acute angle of dopant delivery relative to the substrate. In the example of a U-shaped junction, the substrate is tilted relative to the dopant delivery source in steps, to allow for a plurality of doping delivery steps at different dopant angle trajectories. This allows the dopant to be deposited about the curve of the bottom of the U-shape. Similar techniques may be used for other three-dimensional structures.

Altering the angle of dopant delivery complicates the manufacturing process, leading to increased time and cost of manufacture. Depending upon the structure being built, using multiple delivery steps at different delivery angles may be difficult or impossible to use, depending upon the layout of the structure. For instance, using a non-perpendicular delivery angle on a curved or angled structure will result in different doping amounts being received along the structure.

Acute angle doping may give unsatisfactory results when the feature being doped is curved on the substrate surface. For example, ring modulators are formed having a junction in the cross-section of the ring that extends around the annulus of the ring.

It would be very difficult, if not impossible, to manufacture a ring modulator using a three-dimensional junction (such as a U-shaped junction, for instance) if the dopant delivery angle needs to be altered during fabrication. The difficulty is that a ring modulator has waveguide bends and/or is rotationally symmetric about a central axis. Changing the delivery angle for one radial segment of the ring would result in a different delivery trajectory for the rest of the ring.

Other features may deviate from a straight line across the substrate surface, which present similar difficulties when altering the angle of delivery. For instance, Mach-Zehnder modulators may follow an angled or arcuate path as the interferometer arms are combined. These structures may similarly pose difficulties when attempting to form two junctions in close proximity. Tilting the substrate to change the angle of dopant delivery makes it difficult to separately apply or mask the dopant delivery between the two junctions.

There is a need for a system and method for manufacturing semiconductor structures that overcome some of the limitations of the prior art.

SUMMARY

In an implementation, a method of fabricating a P-N junction in a silicon (Si) structure is provided. The method may include: implanting a first dopant species over a first portion of the Si structure including a first edge of the Si structure; deep implanting a second dopant species over a second portion of the Si structure including a second edge of the Si structure opposed to the first edge but excluding the first edge, wherein the first portion and the second portion overlap in a central portion of the Si structure between the first edge and the second edge, and wherein the second dopant species is implanted below the first dopant species; shallow implanting the second dopant species over the second portion of the Si structure including the second edge of the Si structure opposed to the first edge but excluding the first edge, wherein the second dopant species is implanted above the first dopant species.

In an aspect, the implanting of the first dopant species and the deep and shallow implanting of the second dopant species is performed at a generally normal angle of incidence to the Si structure.

In an aspect, the deep implanting and the shallow implanting of the second dopant species are performed such that area predominantly doped with the second dopant species is a single electrically contiguous area.

In an aspect, the P-N junction comprises a U-shaped P-N junction.

In an aspect, the implanting of the first dopant species is performed with a first mask extending over, and shielding, the second edge.

In an aspect, the deep implanting and the shallow implanting of the second species is performed with a second mask extending over, and shielding, the first edge.

In an aspect, the deep implanting of the second dopant species is performed at a higher energy than the implanting of the first dopant species.

In an aspect, the deep implanting of the second dopant species is performed at a higher energy than the shallow implanting of the second dopant species.

In an aspect, the shallow implanting of the second dopant species is performed at a lower energy than the implanting of the first dopant species.

In an aspect, the shallow implanting of the second dopant species is performed at a same energy as the implanting of the first dopant species.

In an aspect, the deep implanting of the second dopant species is performed at a higher dose than the implanting of the first dopant species.

In an aspect, the deep implanting of the second dopant species is performed at a higher dose than the shallow implanting of the second dopant species.

In an aspect, the deep implanting of the second dopant species is performed at a higher energy than both the implanting of the first dopant species and the shallow implanting of the second dopant species.

In an aspect, the first dopant species comprises a P-type dopant, and wherein the second dopant species comprises an N-type dopant.

In an aspect, the first dopant species comprises an N-type dopant, and wherein the second dopant species comprises a P-type dopant.

In an aspect, the first dopant species comprises boron, and wherein the second dopant species comprises phosphorus.

In an aspect, the Si structure comprises an optical waveguide.

In an aspect, the Si structure is selected from the group consisting of: a ring, a disk, an annulus, an arc, and an angle.

In an implementation, a P-N junction is provided. The P-N junction being manufactured using the above methods. In an aspect, the P-N junction comprises a Mach-Zehnder interferometer. In an aspect, the P-N junction comprises an optical modulator.

BRIEF DESCRIPTION OF THE DRAWINGS

These and other features of the disclosure will become more apparent from the description in which reference is made to the following appended drawings.

FIG. 2 is a vertical sectioned isometric view through an embodiment of a ring modulator.

FIG. 3 is a vertical section of a U-shaped P-N junction

DETAILED DESCRIPTION

Figure 1A:
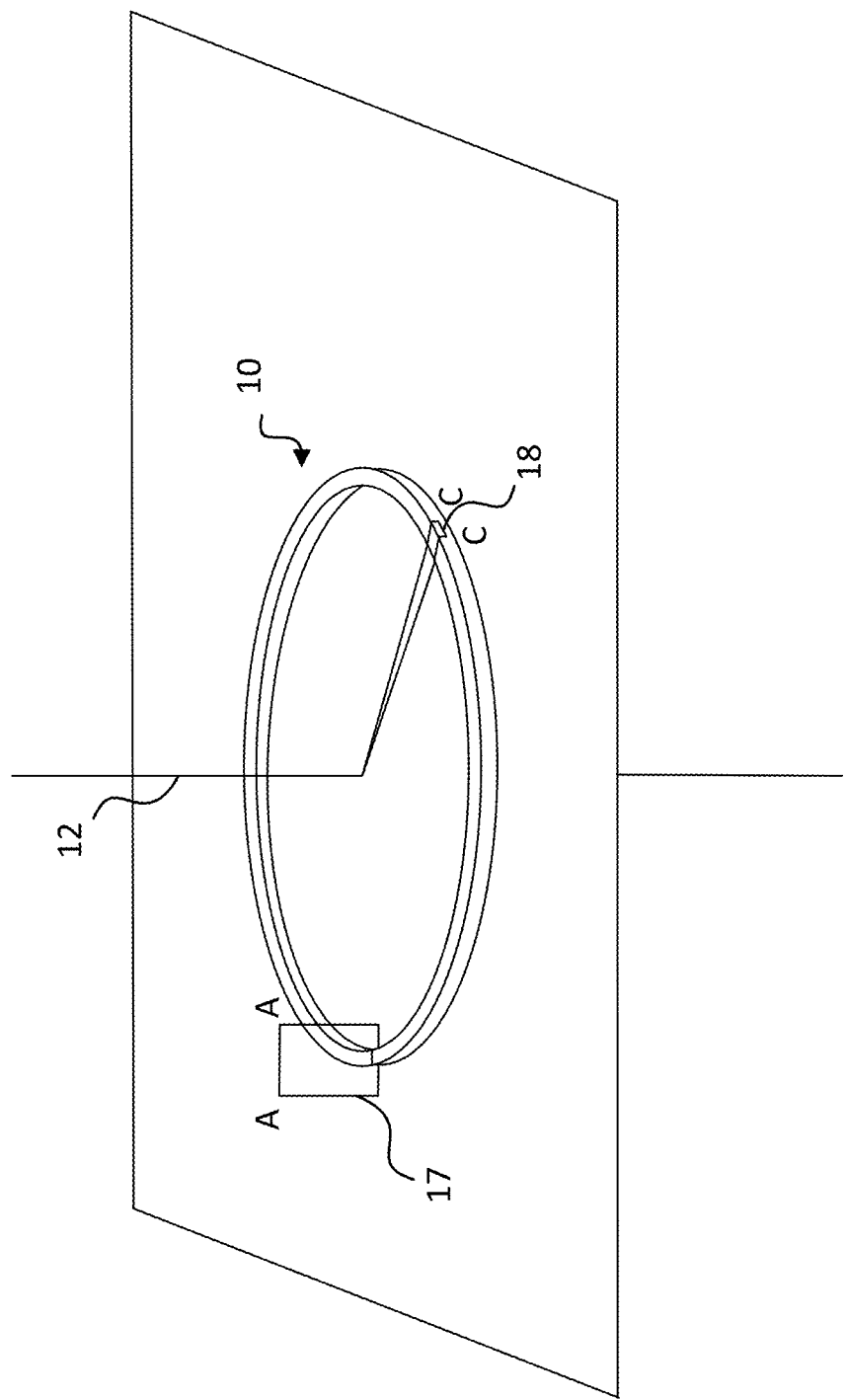
FIG. 1A is an isometric view of an example of a ring modulator.

The following detailed description contains, for the purposes of explanation, numerous specific embodiments, implementations, examples and details in order to provide a thorough understanding of the invention. In particular, a specific example of a three-dimensional structure, in this case a U-shaped P-N junction, is provided including exemplary measurements and positions. The example further includes exemplary delivery energies, dopant dose concentrations and window positioning based on that example. The example is intended to be for illustrative purposes only, and to provide a practical worked example to better describe the invention. The example in the description is not intended to be limiting.

The embodiments and examples described in the application may be practiced without these specific details or with an equivalent arrangement. In other instances, some well-known structures and devices are shown in block diagram form, or not included in the figures, in order to avoid unnecessarily obscuring the embodiments of the invention. The description should in no way be limited to the illustrative implementations, worked example, drawings, and techniques illustrated below, but may be modified within the scope of the appended claims along with their full scope of equivalents. The applicant relies upon the scope of the properly construed claims that follow.

In a first aspect, the present application discloses a method of manufacturing a two-dimensional cross-sectional feature in a silicon (Si) waveguide. The method utilizes a single dopant delivery trajectory at a normal angle of incidence to the Si substrate, which allows for manufacturing a variety of three-dimensional structures including curved or angled structures across the surface of the Si substrate. The single dopant delivery trajectory permits, for instance, the manufacture of structures that have rotational or reflection symmetry, such as rings, disks, squares, symmetrical arcuate sections, etc. As will be appreciated, the single dopant delivery trajectory permits for the manufacture of other non-linear layouts including closed shapes, and open shapes where one portion of the shape would interfere with another portion of the shape if a plurality of dopant delivery trajectories were used. In an implementation the dopant delivery trajectory may conveniently comprise a trajectory that has generally normal angle of incidence to the surface.

In the example provided, the semiconductor feature comprises a U-shaped P-N junction having a cross-section comprising non-straight or curved shapes. In an implementation the feature comprises a U-shaped P-N junction that extends in a circular fashion across the surface of the Si substrate. In an implementation, the U-shaped P-N junction comprises an optical waveguide. In an implementation the feature comprises an optical ring modulator.

In an embodiment, the method comprises multiple dopant delivery steps from a single delivery angle relative to the Si substrate. The multiple dopant delivery steps are applied to a rib of Si that projects above the surface of the Si substrate. In an aspect, the rib further extends along a non-linear path across the Si substrate. For instance, in an aspect the rib may comprise an arcuate or curved path. In an aspect the rib may comprise a closed path describing an outline of a shape on the surface of the Si substrate. In an implementation the rib may describe a circular outline on the surface of the Si substrate.

Each dopant delivery step may differ by at least one of a delivery energy, a dopant dose, a dopant species, and a mask window position. For instance, according to an embodiment the method may comprise a first delivery step delivering a first dopant species, and subsequent second and third delivery steps delivering a second dopant species.

The first delivery step may include using a first mask having a first window at a first position that exposes a first edge of the rib and shields the other second edge of the rib from the first dopant delivery. The second and third delivery steps may include using at least a second mask having a second window at a second position that exposes the second edge of the rib and shields the first edge. Conveniently, the second and third delivery steps may be completed with the second mask, avoiding an additional lithography step. A third mask may be used for the third delivery step where desired or convenient for the manufacturing process.

The second delivery step may be performed at a higher delivery energy than the first and third delivery steps to deliver the dopant below the implantation resulting from the first implantation step. In an aspect, the second delivery step may have a higher dopant dose concentration than at least the third delivery step. The second delivery step may further have a higher dopant dose concentration than the first delivery step.

The third delivery step may be performed at a lower delivery energy than the second delivery step to deliver the dopant above the implantation resulting from the second delivery step. In an aspect, the third delivery step may further be formed at or below the delivery energy of the first implantation step to deliver the dopant above the implantation resulting from the first delivery step.

Figure 1B:
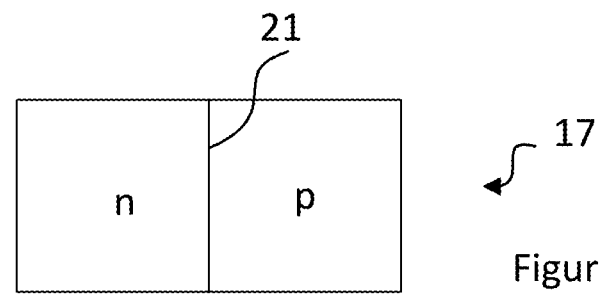
FIG. 1B is a vertical section through a ring modulator.
Figure 1C:
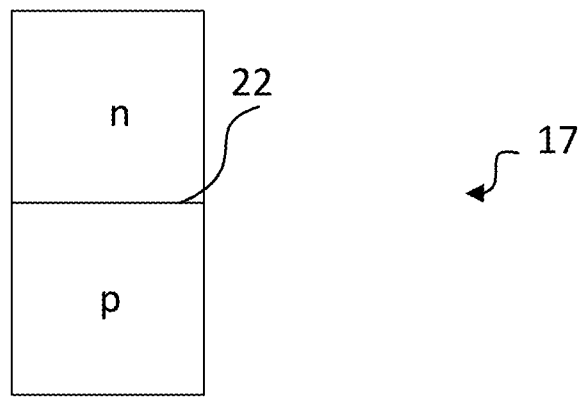
FIG. 1C is a vertical section through another ring modulator.
Figure 1D:
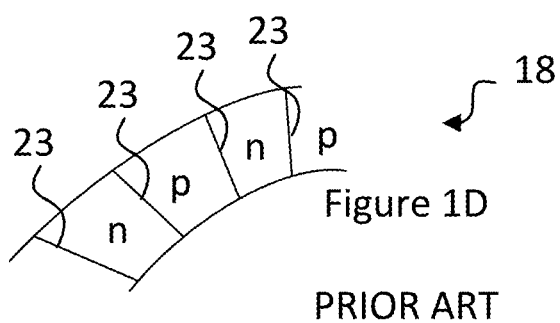
FIG. 1D is a horizontal section through a further the ring modulator.

Referring to FIG. 1A, a ring modulator 10 projects above a Si substrate 15. FIG. 1A is a simplified diagram which omits the connections and other structures supporting the ring modulator 10. The ring modulator 10 is an annulus that has radial symmetry about a central axis 12. FIG. 1A further includes two sections A-A 17 and C-C 18 to illustrate exemplary junction profile configurations for the ring modulator 10. FIGS. 1B, 1C, and 1D illustrate prior art junction profiles for the ring modulator 10. The relative positions of the P-regions and N-regions in FIGS. 1B, 1C, and 1D are for illustrative purposes only, and could be interchanged, depending upon design requirements.

FIG. 1B illustrates an embodiment of the ring modulator 10 of FIG. 1A, where the junction is a lateral P-N junction, as seen in the vertical section A-A. In the lateral P-N junction illustrated, the P-region comprises an outer annulus and the N-region comprises an inner annulus. The inner N-region annulus and the outer P-region annulus make up the ring modulator 10. The depletion region of the junction 21 is disposed vertically in the cross section 17, forming a narrow annulus located between the inner annulus and the outer annulus in three dimensions.

Referring to FIG. 1C illustrates an embodiment of the ring modulator 10 of FIG. 1A, where the junction is a vertical P-N junction, as seen in vertical section A-A 17. In the vertical P-N junction illustrated, the P-region comprises an upper annulus and the N-region comprises a lower annulus. The lower N-region annulus and the upper P-region annulus make up the ring modulator 10. The depletion region of the junction 22 is disposed horizontally in the cross section 17, forming a thin annulus located between the upper annulus and the lower annulus in three dimensions.

FIG. 1D illustrates an embodiment of the ring modulator of FIG. 1A, where the junction is an interleaved (also called "interdigitated") P-N junction, as seen in the horizontal section C-C 18. In the interleaved P-N junction illustrated, the P-regions and N-regions comprise alternating radial segments of the ring modulator 10. The junctions 23 for an interleaved P-N junction, are vertical planes in the horizontal cross section 18, between the unions of the P-region and N-region segments.

In all three cases, the depletion regions 21, 22, 23 comprise planar interfaces (i.e. 2-dimensional) interfaces between the P-regions and the N-regions. In the exemplary P-N junction illustrated, the P-region and N-regions comprise alternating radial segments of the ring modulator 10.

FIG. 2 illustrates an isometric sectional view of a curved section 22 of a ridge waveguide 60, showing an exemplary embodiment of a U-shaped P-N junction. The isometric view illustrates how the P-region and N-region extends in three dimensions, forming the curved waveguide section 62 over a substrate 15. The junction 224 for the U-shaped P-N junction has two dimensional features across the waveguide cross-section. The junction 224 follows the contours of the U-shaped N-type region as it meets the P-type region. The junction 224 exits the rib as a depletion region 24 that follows the length of the curved waveguide section 62.

Referring to FIG. 3, the sectional view of FIG. 2 is repeated to further illustrate an N-type region 32 in the outer portion of the curved waveguide section 62 of FIG. 2, while the P-type region 44 is the inner portion of curved waveguide section 62 of FIG. 2. While the P-N junction is illustrated with a U-shaped P-type region 34 and an interceding N-type region 32 separating the arms of the U, the regions may be reversed depending upon design requirements. Also illustrated in FIG. 3 are an N-type contact 33 and a P-type contact 35 for connecting the P-N junction to other features (not shown in FIG. 2) on the substrate 15.

The N-type region 32 extends from an outer edge 36 of the curved waveguide section 62, into the central portion of the curved waveguide section 62. The U-shaped P-type region 34 extends from an inner edge 38 of the curved waveguide section 62, into the central portion, surrounding the N-type region 32. The U-shaped P-type region 34 includes a lower arm 43 that extends from the P-type contact 35, forming the base of the curved waveguide section 62. The lower arm 43 necessarily ends short of the outer edge 36 to allow the N-type contact 33 to connect to the N-type region 32. The U-shaped P-type region 34 further includes an upper arm 42 that extends along the top face 51 of the curved waveguide section 62, above the N-type region 32. The lower arm 43 and upper arm 42 are connected by a curved portion 44 that makes up the base of the U-shape. The curved portion 44 extends along the inner edge 38 of the curved waveguide section 62.

The junction 224 is illustrated where the U-shaped N-type region meets the P-type region. Referring to FIGS. 2 and 3, in this example of the curved wave guide section 22, the junction 224 exits the curved waveguide section 62 at the top face 51 of the ring modulator 10 as a linear depletion region 24. The junction 224 may exit the curved waveguide section 62 through the top face 51 and opposite the end of the lower arm 43, to conveniently provide a generally symmetrical U-shaped P-N junction profile. In alternate embodiments, it may be possible for the junction 224 to exit the curved waveguide section 62 on the outer face 52 of the ring modulator 10. The alternate embodiments may be used, for instance, where a generally symmetrical U-shaped P-N junction profile is not required.

Figure 4A:
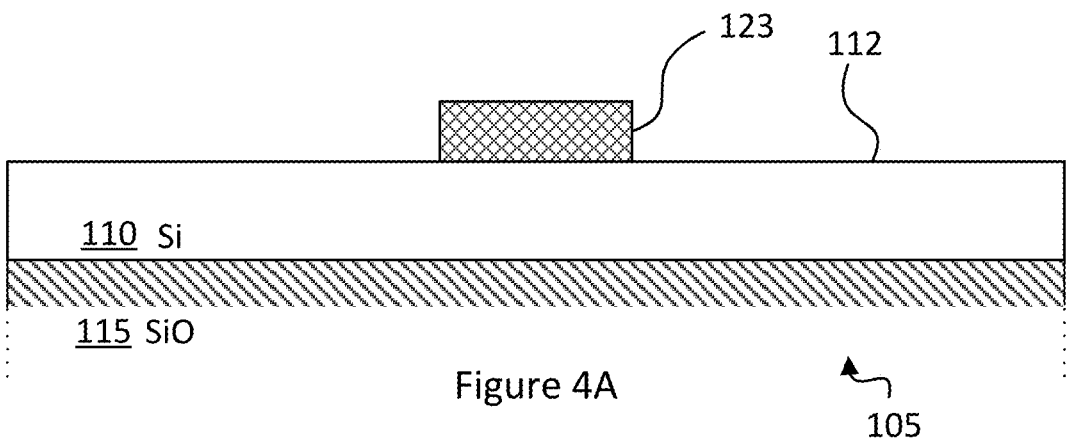
FIGS. 4A, 4B, and 4C are cross-sectional views illustrating a process for creating a ridge structure.
Figure 4B:
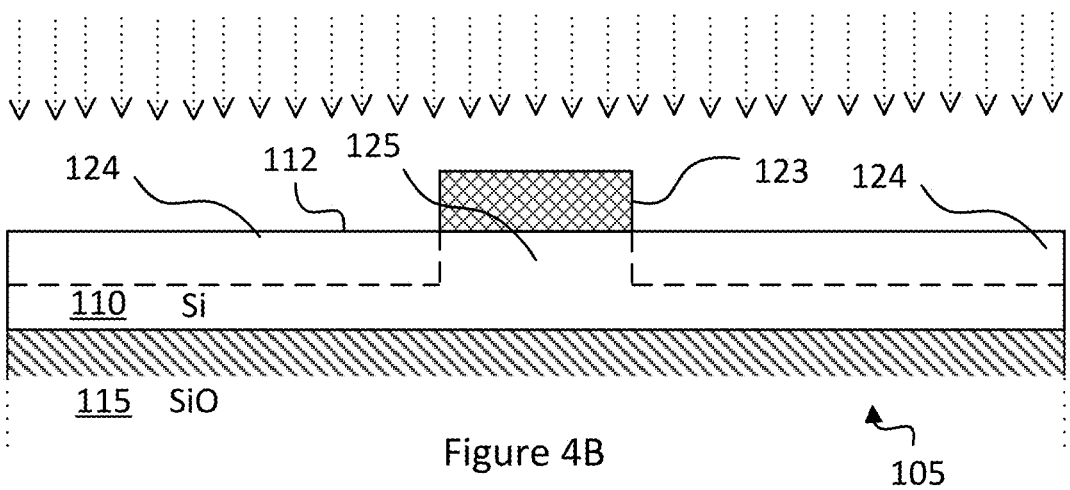
Figure 4C:
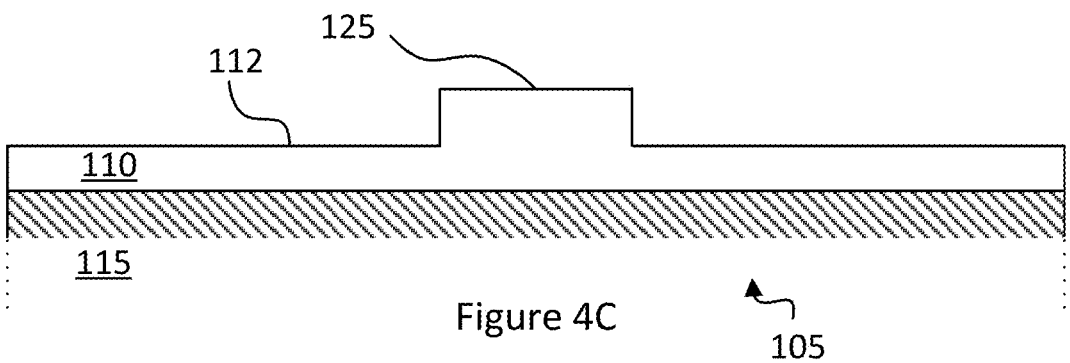

FIGS. 4A, 4B, and 4C are cross-sectional views illustrating a process for manufacturing a three-dimensional structure on a Si substrate. Referring to FIG. 4A, a silicon-on-isolator (SOI) structure includes a Si substrate 105, a buried oxide layer 115 on the Si substrate 105, and a Si layer 110 on the buried silicon oxide (SiO₂) layer 105. The Si layer 110 may be etched to form waveguides or other structures, as required. In a first step, a mask 123 may be laid out on the Si layer 110. In the case of a ring structure, the mask 123 would extend in a circular fashion on the surface of the Si layer 110. Similarly, other shapes may be formed by extending the mask 123 as required. Additional layers, or bulk material, may extend below or above the illustrated layers as required.

Referring to FIG. 4B, in a second step an etchant is applied to the masked substrate to remove the required material to define the height of the structure. The target removal layer 124 lies exposed to the etchant to be removed during the etching process. The intended structure, in this example a rib 125, lies below the mask 123, and is protected during the etching process.

FIG. 4C illustrates the etched product, with the rib 125 extending above the surface 112 of the substrate 105. As indicated above, depending upon the structure required, the rib 125 may extend as necessary across the surface 112 of the substrate 105.

FIGS. 5A, 5B, 5C, 5D, 5E, and 5F are cross-section views illustrating doping steps to form a P-N junction in the rib 125. As with FIGS. 4A, 4B, and 4C, the doping steps may be applied across the structure on the surface of the substrate 105.

Figure 5A:
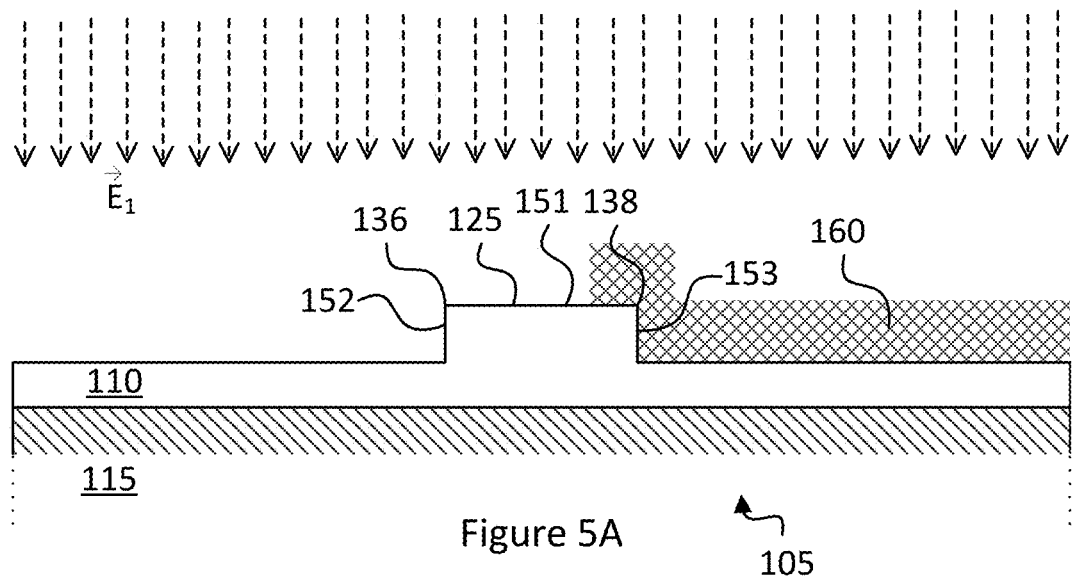
FIGS. 5A, 5B, 5C, 5D, 5E, and 5F are cross-section views illustrating doping steps to build the U-shaped junction of FIG. 2 in the ridge structure of FIG. 4C.

Referring to FIG. 5A, in a first implantation step, a first dopant species is implanted in a first exposed portion of the Si layer 110 and a first portion of the rib 125, including a first edge 136 and a central portion or the rib 125, at a first dosage and a first implantation energy $E_1$. In order to define the first exposed portion, a first mask 160 is applied to overlap a first shielded portion of the Si layer 110 and to extend over a portion of the top surface 151 of the rib 125 to overlap and shield a second edge 138 of the rib 125 opposed to the first edge 136. The first mask 160 defines a first window that exposes the first edge 136 and a central portion of the rib 125 to be implanted with the first dopant species.

Also identified in FIG. 5A is the top surface 151 of the rib 125, a first side face 152 adjacent to the first edge 136, and a second side face 153 adjacent to the second edge 138. Referring to FIG. 5A, the first side face 152 corresponds to the outer face of the ring 10 illustrated in FIG. 1A, while the second side face 153 corresponds to the inner face of the ring 10 illustrated in FIG. 1A.

Figure 5B:
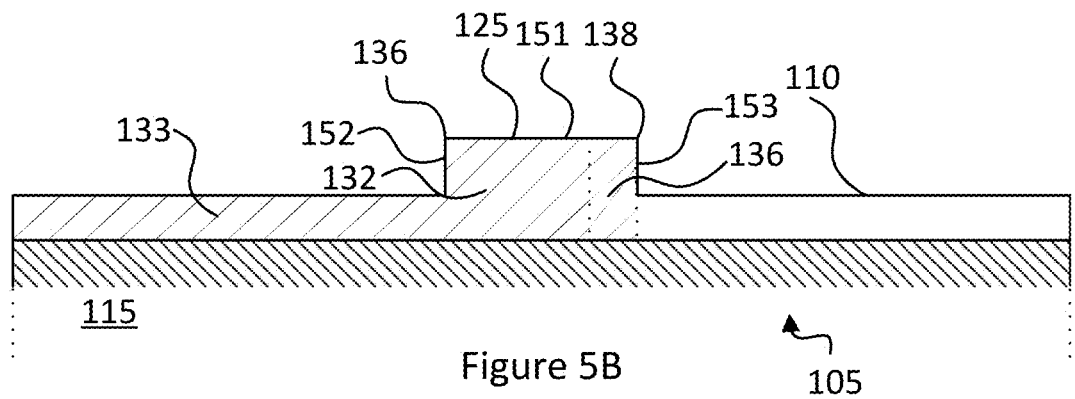

Referring to FIG. 5B, the first mask 160 has been removed after the first implantation step. The exposed portion has now been doped with the first dopant species, while the shielded portion is still predominantly undoped (i.e. Si in this example). A first contact 133 has been doped with the first dopant species. A first dopant region 132 has been created in the rib 125. The portion of the rib 125 that was shielded by the first mask 160 comprises a transition zone 199 that may include some amount of the first dopant species, decreasing as from the edge of the shielding towards the second edge 138.

Figure 5C:
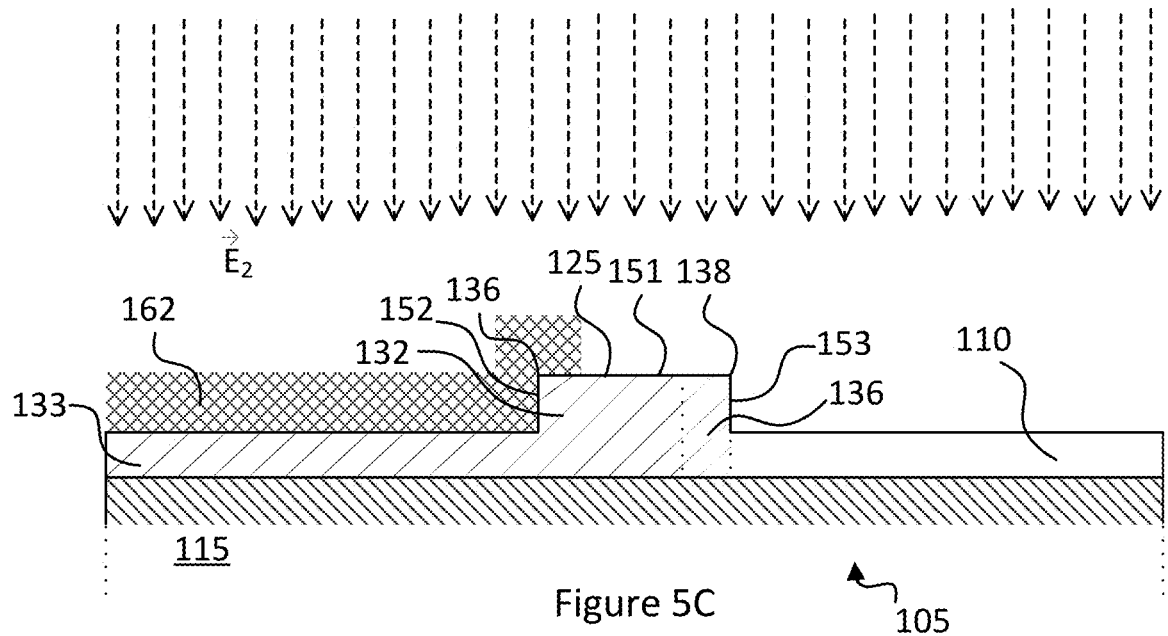

Referring to FIG. 5C, in a second, "deep" implantation step, a second dopant species is deep implanted in a second exposed portion of the Si 110 and a second portion of the rib 125, including the second edge 138 and the central portion or the rib 125, at a second dosage and a second implantation energy $E_2$. The second implantation energy $E_2$ is greater than the first implantation energy $E_1$ in order to deep implant the second dopant species below the first dopant species in the rib 125 during the second, deep implantation step. The second dosage may be greater than the first dosage, but is not necessarily a higher dosage.

In order to define the second exposed portion, a second mask 162 is applied to overlap a second shielded portion covering the previously implanted first contact 133 and to extend over a portion of the top surface 151 of the rib 125 to overlap and shield the first edge 136 of the rib 125. The second mask 162 defining a second window that exposes the second edge 138 and the central portion of the rib 125 to be deep implanted with the second dopant species.

Figure 5D:
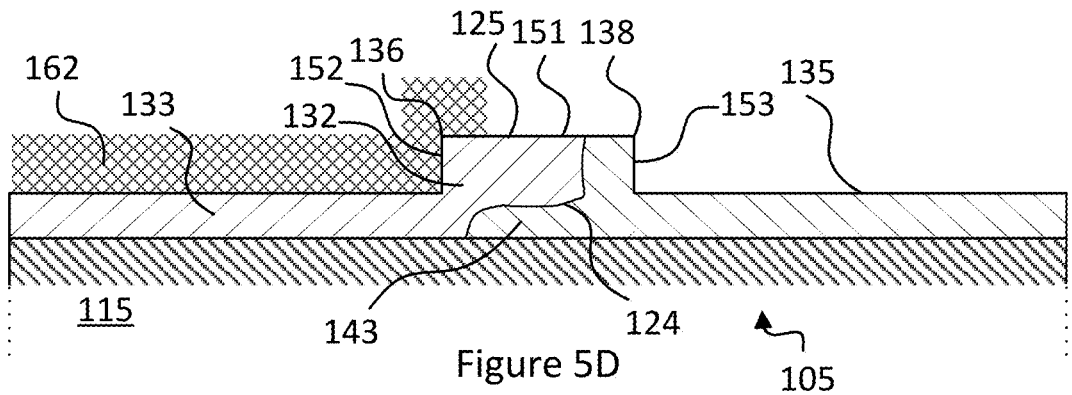

Referring to FIG. 5D, the result of the second implantation step is illustrated with the second mask 162 still in place. A second contact 135 is shown implanted with the second dopant species. In the rib 125, the second, deep implantation step has deep implanted the second dopant species below the first dopant species in the lower arm 143. A junction boundary 124 has been created, forming a depletion zone between the first dopant species and the second dopant species. The junction boundary 124 will move and be finalized with a third, "shallow" implantation step. Herein and throughout the rest of the specification, the terms "deep" and "shallow" denote a depth of implantation relative to one another, i.e. a "shallow" implantation has a smaller depth of implantation than a "deep" implantation. Furthermore, it will be appreciated that the junction boundary 125, denoted with a line, is actually a zone where there is a transition between the first dopant region and the second dopant region (i.e. between the P-type region and the N-type region, or vice versa, as the case may be).

Figure 5E:
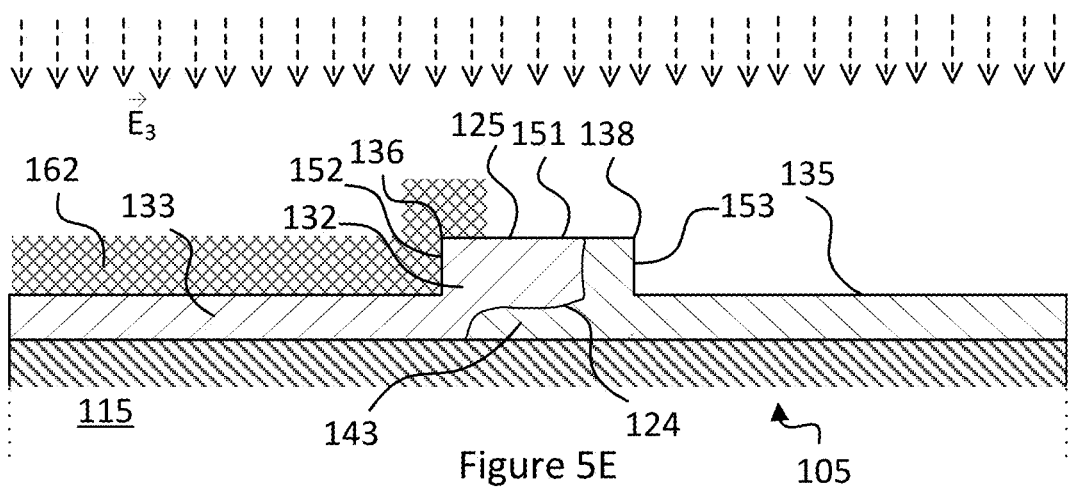

Referring to FIG. 5E, in a third, "shallow" implantation step, the second dopant species is shallow implanted in the second exposed portion of the Si 110 and the second portion of the rib 125, including the second edge 138 and the central portion or the rib 125, at a third dosage and a third implantation energy $E_3$. The third implantation energy $E_3$ may be lower than the second implantation energy $E_2$ and equal to or lower than the first implantation energy $E_1$ in order to shallow implant the second dopant species above the first dopant species in the rib 125 during the third, shallow implantation step (i.e. $E_3 \leq E_1 < E_2$).

Figure 5F:
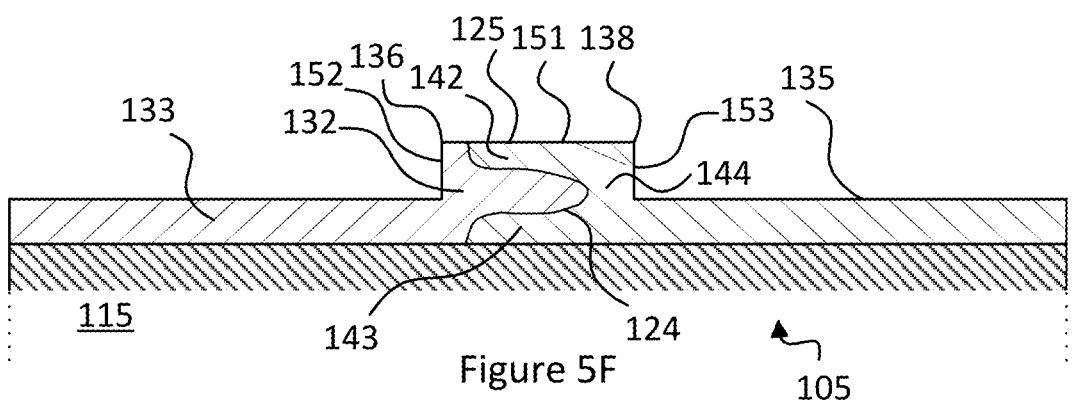

Referring to FIG. 5F, the result of the third, shallow implantation step is illustrated with the second mask 162 removed. In the rib 125, the third, shallow implantation step completes the upper arm 142 of the U-shaped junction. A curved portion 144 joins the upper arm 142 to the lower arm 143 and the second contact 135, such that the area predominantly doped with the second dopant species is a single electrically contiguous area. The junction boundary 124 has moved, and finalized, with the third, shallow implantation step to demark the transition zone between the upper arm 142, curved portion 144, and lower arm 143 with the first dopant region 132.

The overlap of the first mask 160 with the second edge 138 and the second mask 162 with the first edge 136 may vary depending upon dopants, dopant concentrations, dosage energies, and material type. These parameters may be evaluated by modeling a desired feature width, i.e. width of the rib 125, and running simulations with selected first and second dopant species. The goal of the simulations is to model the lateral spread of each implanted dopant species, as well its location within the feature. As known, the lateral spread may vary based upon the dose and mobility, as well as scattering and annealing. In the exemplary rib 125, the first mask 160 overlaps the second edge 138 about a ⅛th the width of the rib 125, and similarly the second mask 162 also overlaps the first edge 136 about a ⅛$^{th}$ the width of the rib 125.

As compared with prior art manufacturing techniques, the above process eliminates the need for changing the implantation angle and builds the junction in 3 steps (1 step with the first dopant species, and 2 steps with the second dopant species. By comparison, the prior art methods require at least 4 implantation steps along with a varied implantation angle.

In an implementation, the implantation of the first dopant species, the deep implantation of the second dopant species, and the shallow implantation of the second dopant species are performed at a generally normal angle of incidence relative to the surfaces of the substrate 105.

EXAMPLE

A practical example of the steps and parameters for a selected U-shaped junction is described below. The example is for a 700 nm wide junction for an optical waveguide, with the implantation occurring across 27,500 nm (i.e. 27.5 μm). The junction is a wide junction to assist with simplifying the manufacturing process for a U-shaped junction. In the case of an optical waveguide, the junction may be wider than normal for a single mode, but preferably only wide enough to support at most one or two additional modes. While it is simpler to fabricate a wide U-shaped junction, if it is wide enough, additional unwanted modes may propagate. The implantation width, 27.5 µm, is relatively arbitrary, and includes implantation of contact areas to join the feature to other components.

The three implantation steps for the formation of the U-shaped P-N junction are detailed in Table 1 below. As will be appreciated, additional steps may be required to create contacts between the doped silicon layer and metal layers and to complete the feature as are known in the art. For instance, implantation steps to complete the contacts, and an exemplary thermal annealing step are indicated in Table 1.

A first implantation step of a first dopant species, boron (B) in this example, is performed over a first window extending over a first side of the feature. The first window may be defined with reference to a first mask shielding the remainder of the feature. The extent of the first window is defined in Table 1 with reference to a center point of the feature (i.e. rib 125). In this example, the first window extends 26 µm (260 nm) past the center point, and accordingly the masks would shield about 90 nm from the edges of the feature (rib 125). The shielded width defining the thickness of the bottom curve 144 of the U-shape, as well as the connecting portion of the first dopant region 132.

Second and third implantation steps are performed using a second dopant species, phosphorous (P) in this example, which is complementary to the first dopant species. The implantation is performed over a second window extending over a second side of the feature opposite to the first side. The extent of the second window may similarly be defined with reference to the center point of the feature.

Thus, in at least one embodiment, the two implantation windows partially overlap within a central portion of the feature. In at least one embodiment, the second and third implantation steps implanting the second dopant species are performed at two different implantation energies and doses. The "B" and "P" species of this example correspond to P-type doping and N-type doping, respectively. The resulting P-N junction has a U-shaped profile characterized by a middle area of N-type doping (i.e. the first dopant region 132) which is surrounded (or partly surrounded) by a U-shaped P-type doping area (the second dopant region 134). In other embodiments, the two types and species may be swapped, although the exact doses and energy may require some modification for efficient fabrication. The use of B and P as the dopants are by way of example only, and not intended to be limiting. Furthermore, the indicated energies and doses are by way of example. In the example of Table 1, the first implanting step and the third implanting step are performed at a same energy.

In some embodiments, the first implanting step may occur at a higher energy than the third implanting step, depending upon a mobility of the first dopant species and the second dopant species. For instance, in the second example illustrated in Table 2, the first implantation step and the second implantation step are performed using a same dose with different delivery energies. The first implantation step and the third implantation step being performed at different delivery energies and different doses. In this example the first implantation step is performed at a higher energy and a higher dose than the third implantation step. The example of Table 2, unlike the example of Table 1, includes a process in which a 10 nm thick layer of $SiO_2$ was deposited before the doping steps, as is known in the art. The use of the $SiO_2$ layer boosts the doping concentration during the implantation steps, after which the $SiO_2$ layer may be stripped off.

TABLE 1

Implantation steps for forming a first implementation of a P-N Diode (note: the window is defined above the junction, referenced from a center point of the junction as 0)

| Step | Species | Energy (keV) | Dose (cm$^{-2}$) | Window (µm) | Tilt Angle (°) |
|---|---|---|---|---|---|
| 1 | B | 10 | 7.2E13 | (−13.75, 0.26) | 0 |
| 2 | P | 75 | 9.4E13 | (−0.26, 13.75) | 0 |
| 3 | P | 10 | 1.5E13 | (−0.26, 13.75) | 0 |
| 4 | | | Steps for Making Contacts | | |
| 5 | | | | | |
| 6 | | | Rapid thermal Annealing at 1030° C. for 5 seconds | | |

TABLE 2

Implantation steps for forming a second implementation of a P-N Diode (note: the window is defined above the junction, referenced from a center point of the junction as 0)

| Step | Species | Energy (keV) | Dose (cm$^{-2}$) | Window (µm) | Tilt Angle (°) |
|---|---|---|---|---|---|
| 1 | B | 20 | 3.5E13 | (−13.75, 0.26) | 0 |
| 2 | P | 90 | 3.5E13 | (−0.26, 13.75) | 0 |
| 3 | P | 15 | 1.5E13 | (−0.26, 13.75) | 0 |
| 4 | | | Steps for Making Contacts | | |
| 5 | | | | | |
| 6 | | | Rapid thermal Annealing at 1030° C. for 5 seconds | | |

Figure 6A:
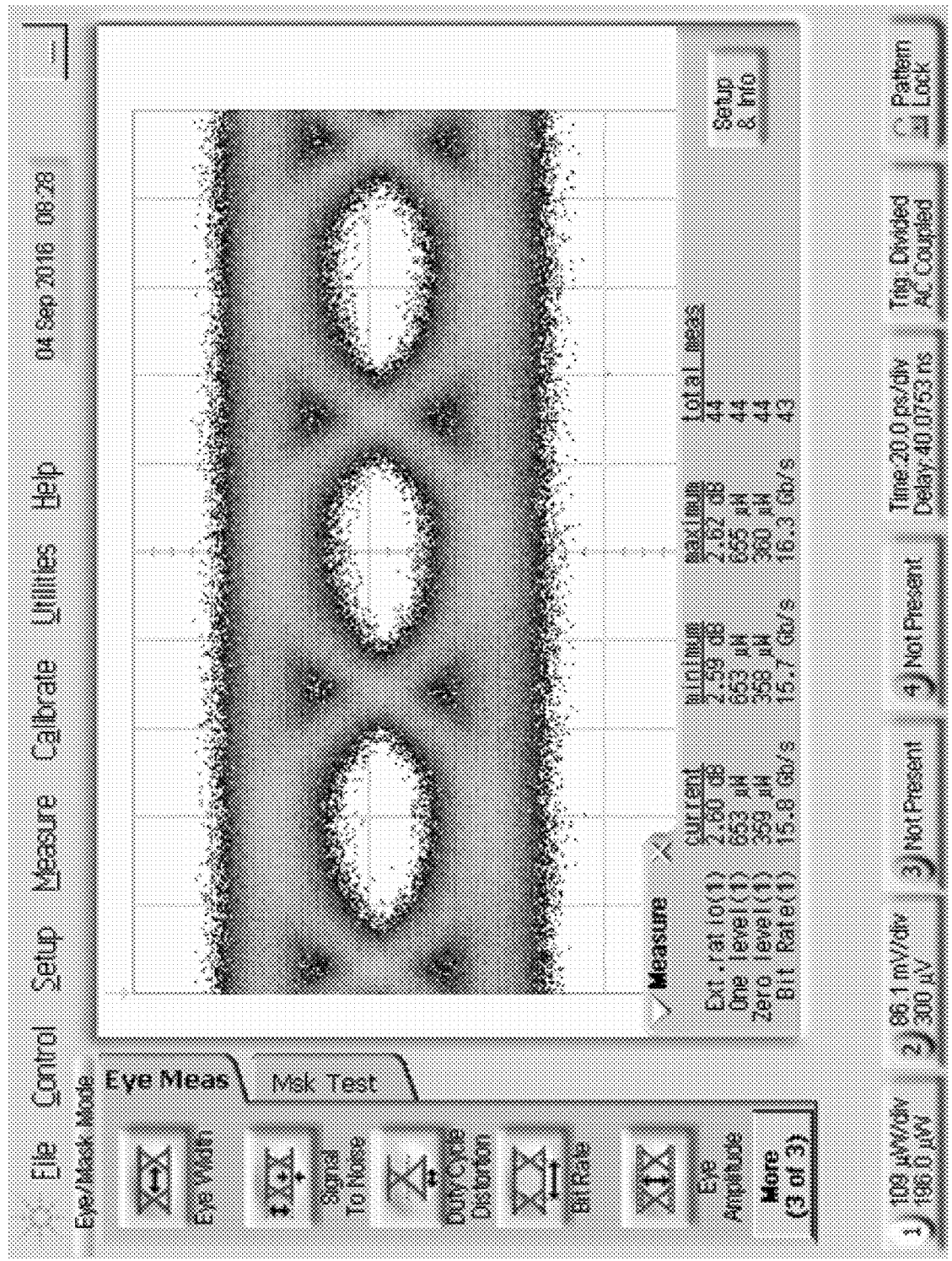
FIGS. 6A, 6B, and 6C are eye diagrams for an exemplary Mach-Zehnder modulator sampled at different bit rates.
Figure 6B:
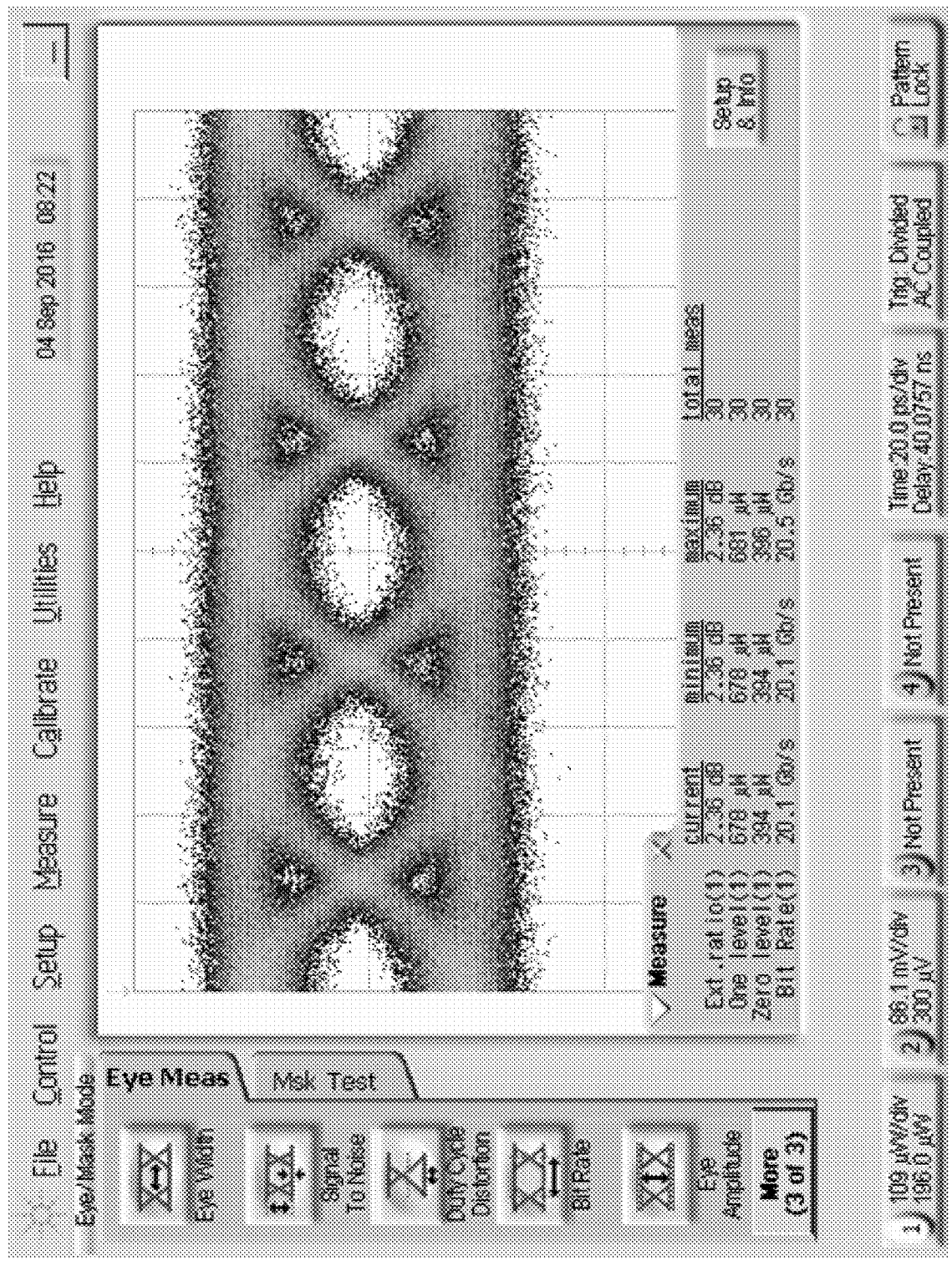
Figure 6C:
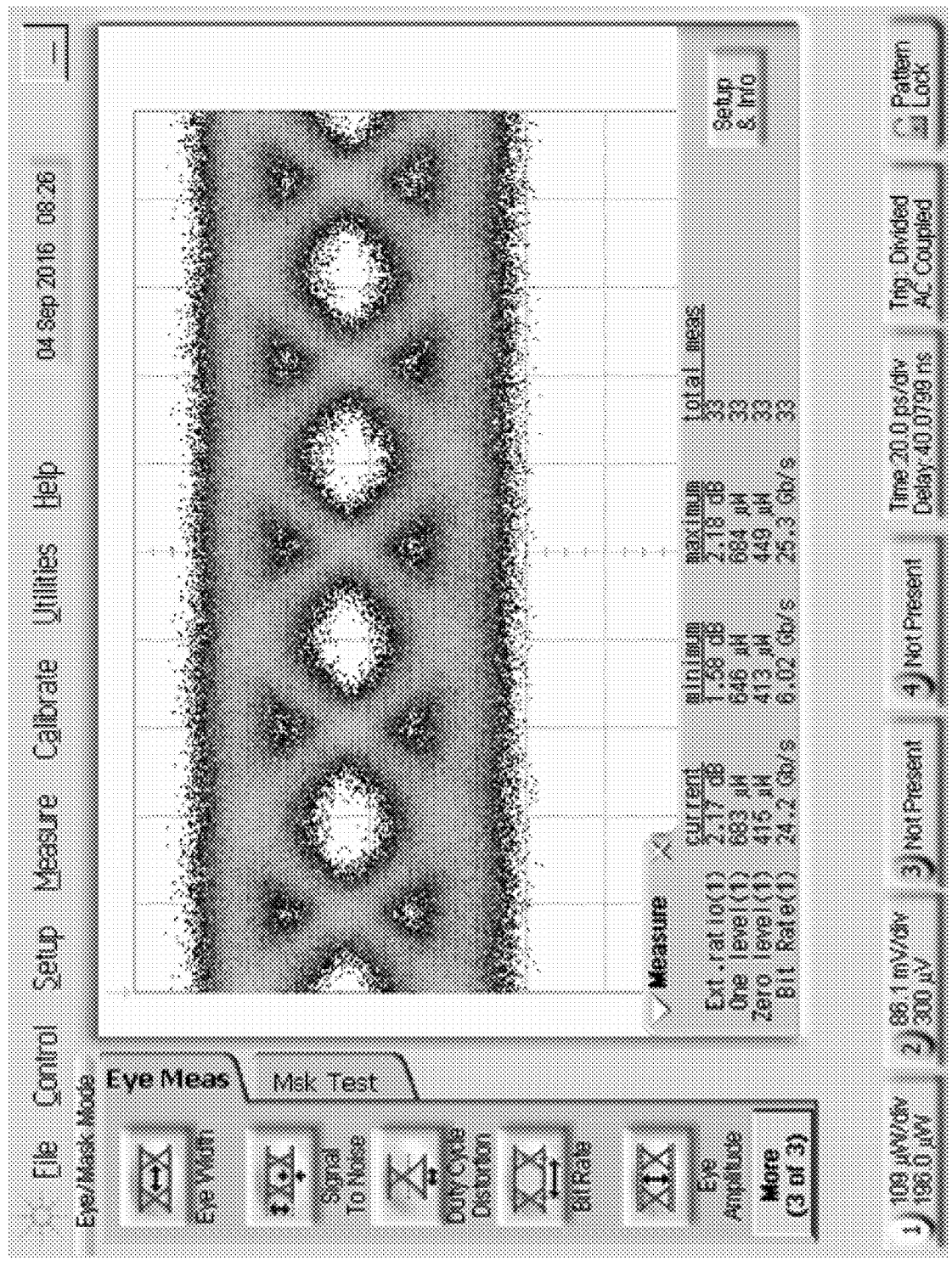
Figure 7:
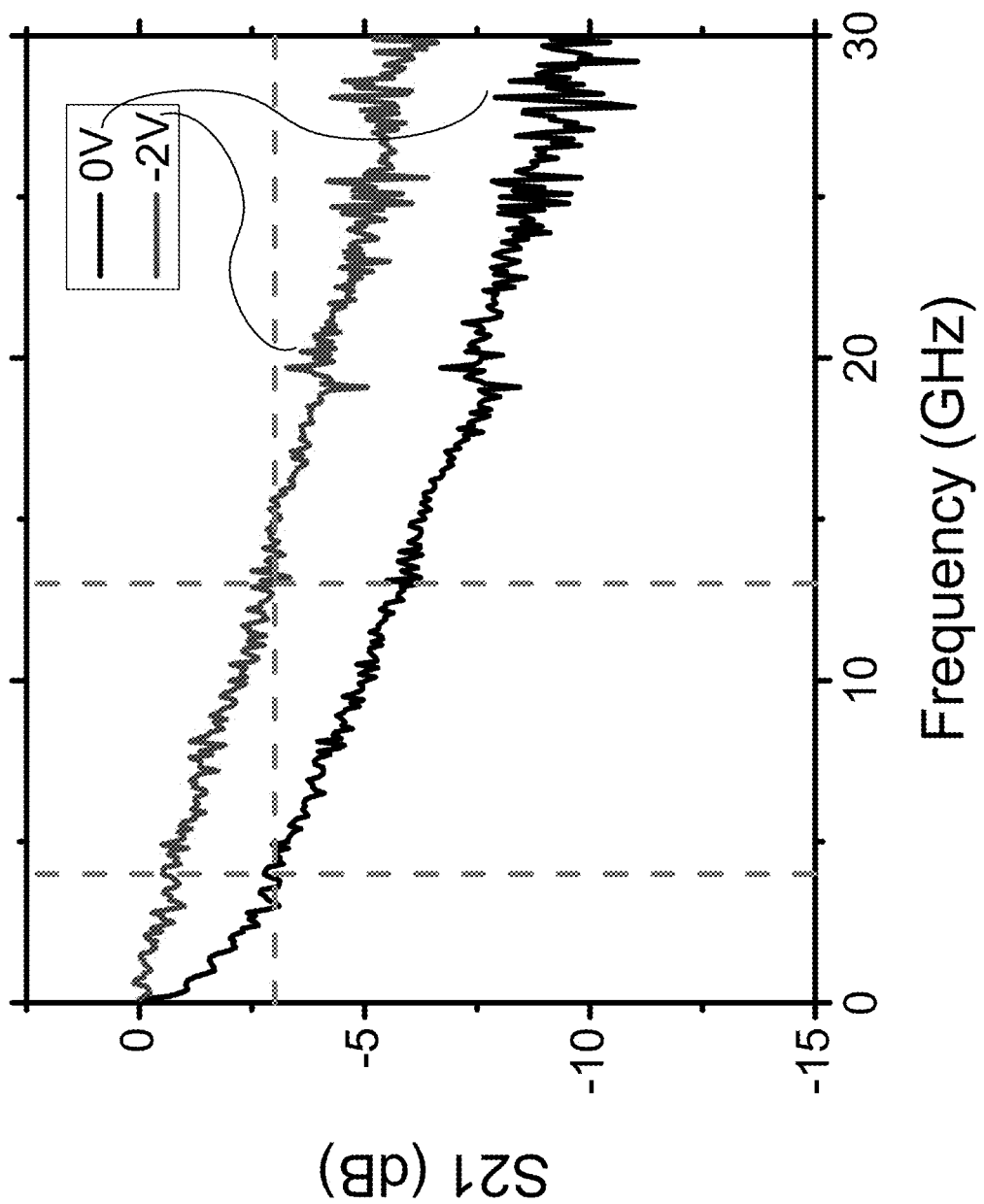
FIG. 7 is a graph plotting the electro-optical (EO) parameter S21 of the Mach-Zehnder modulator at different driving frequencies.
Figure 8:
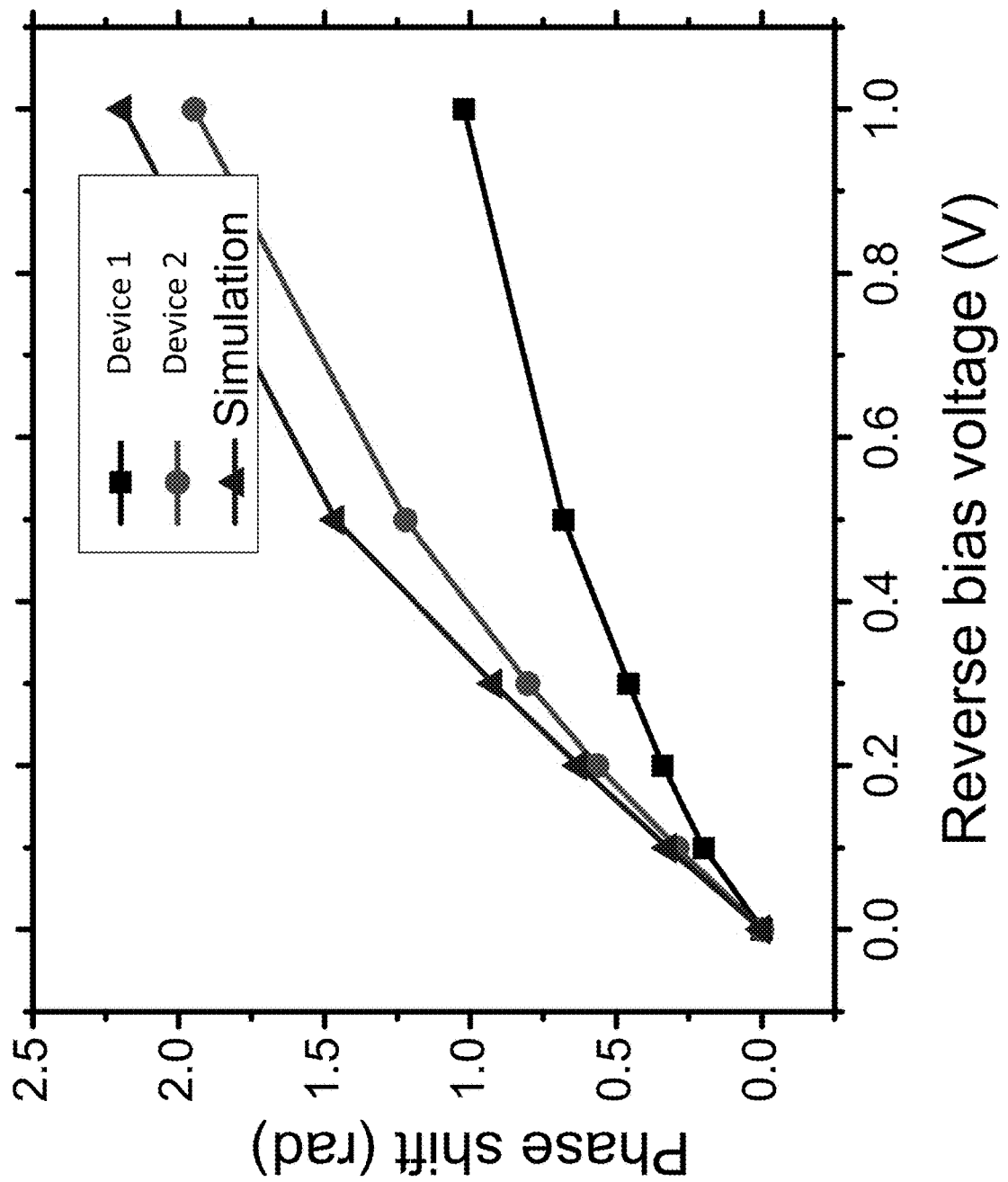
FIG. 8 is an electro-optical response curve for the left arm of two exemplary Mach-Zehnder interferometer embodiments, as compared with simulated results.
Figure 9:
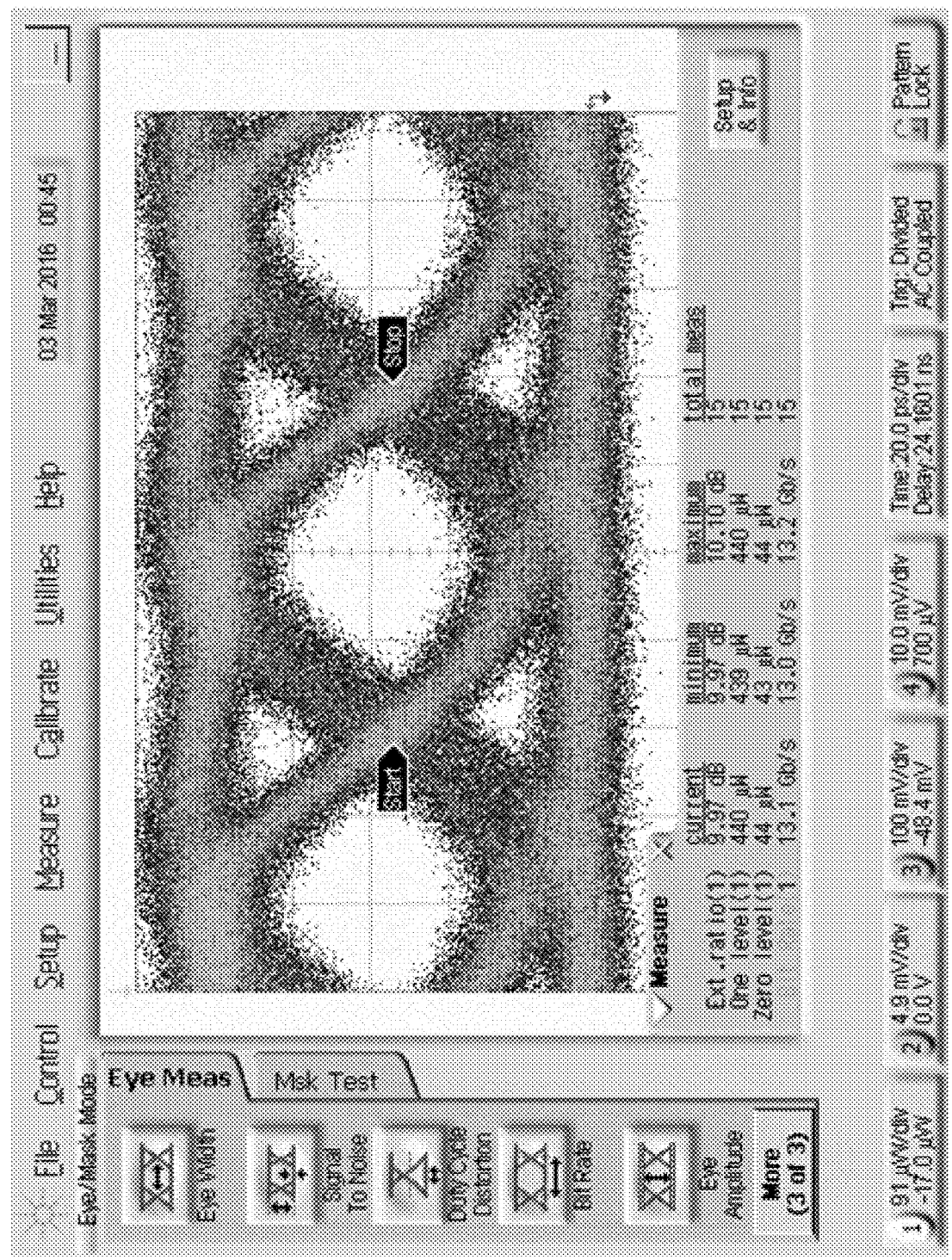
FIG. 9 is an eye diagram for an exemplary ring modulator.
Figure 10:
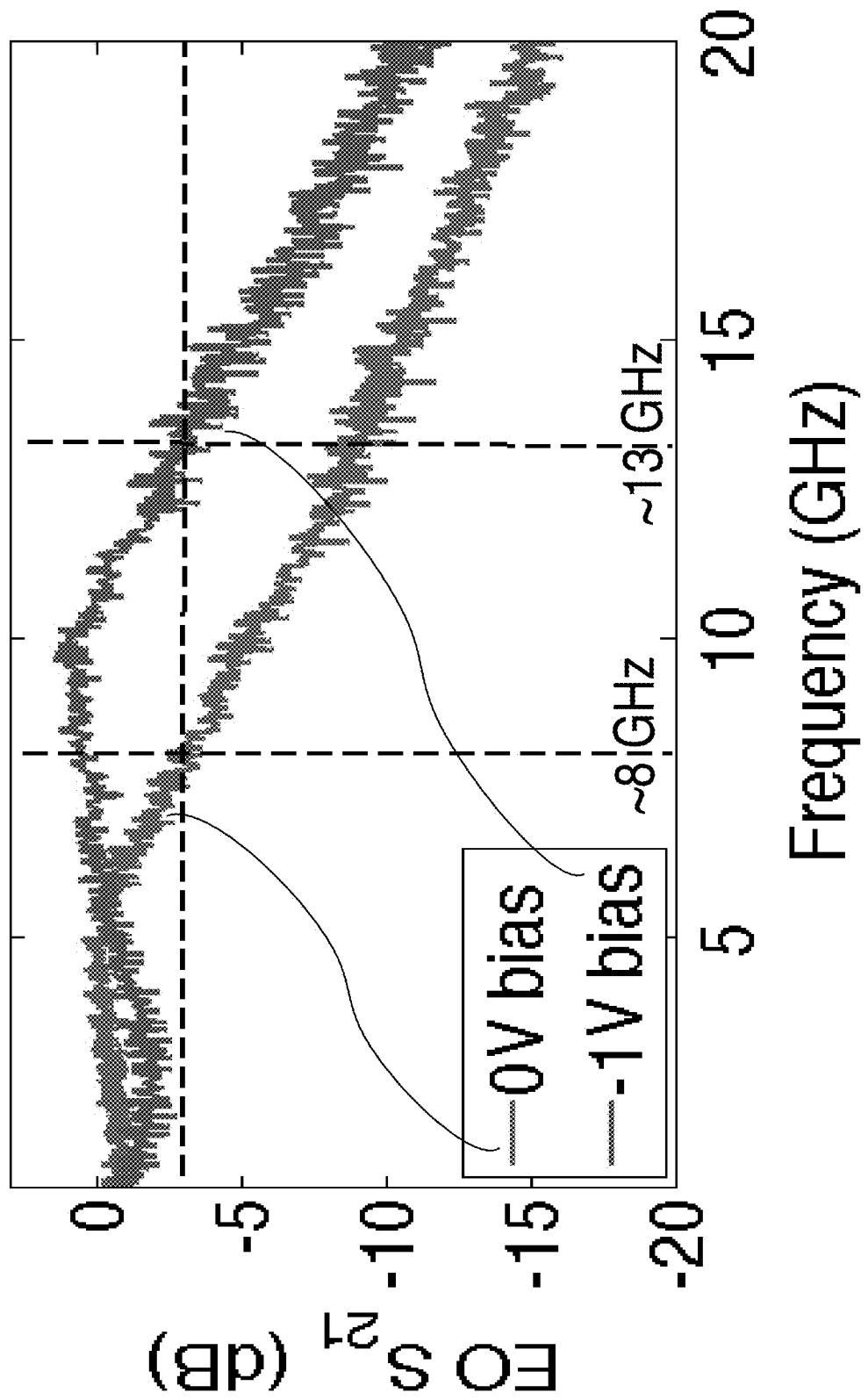
FIG. 10 is a plot showing the (EO) $S_{21}$ parameter for the exemplary ring modulator at different voltages.

In some embodiments, an efficient modulator is implemented by providing a P-N junction with a U-shaped carrier depletion region. The P-N junction manufactured by a sequence of three implantation steps at a single implantation angle, i.e. generally orthogonal to the substrate plane. The U-shaped P-N junction may achieve high modulation efficiency by increasing the overlap of the carrier depletion region with the optical mode and by increasing the capacitance in the vertical direction. FIGS. 6A, 6B, and 6C are eye diagrams showing results for a Mach-Zehnder modulator (MZM) sampled at different bit rates. FIG. 7 illustrates plots of electro-optic (EO) $S_{21}$ parameter at different voltages, and a 3 dB bandwidth of about 13 GHz. FIG. 8 illustrates plots of the Phase Shift vs. the reverse bias voltage as extracted from two MZM test structures (Device 1 and Device 2) based upon the above exemplary P-N junction detailed in Table 2 as compared with simulation results. Device 1 and Device 2 being produced a same implantation run. The variance in their results is a function of the variance in the formation of the P-N junction formed as a result of alignment errors in the mask during the fabrication process. Device 2 having a higher efficiency, but a lower bandwidth than Device 1. The eye diagrams of FIGS. 6A, 6B, and 6C, and the plots of FIG. 7 are taken from Device 1 which has the higher bandwidth of the two test structures. FIG. 9 shows results for an exemplary microring modulator constructed using the parameters of Table 1 with a diameter of 65 µm. The DC tuning efficiency is 52 pmV$^{-1}$ between 0 and −0.5V, which is similar to the performance of vertical PN junctions when accounting for the differences in wavelength, Si plasma dispersion effect, and cavity finesse. FIG. 9 shows an eye diagram of one example of a microring modulator having a diameter of 65 µm and a drive voltage of 1.6 $V_{pp}$. The bit rate is limited by a combination of the microring linewidth (about 60 pm=8 GHz) and the diode. FIG. 10 shows the electro-optic (EO) $S_{21}$ parameter and 3 dB bandwidth for this microring modulator at drive voltages of 0V and −1V.

Exemplary Implementations

In an implementation, the above described U-shaped P-N junction may define, or at least partly define, a modulator such as a ring modulator as shown, or a Mach-Zehnder modulator for instance. The Mach-Zehnder modulator may be used, for instance, in a dual arm Mach-Zehnder carrier injection switch, or a dual-arm Mach-Zehnder depletion-mode modulator.

In an implementation, the U-shaped P-N junction may also define, or at least partly define, a photodiode (PD), such as a germanium photodiode having a germanium absorption layer. The PD may be a P-N or P-I-N junction photodiode, and the N and/or the N doping of the U-shaped junction modulator may form one or both doping regions of the PD.

In an implementation, the feature being doped may comprise a feature that is not a straight line across the substrate. In an aspect, the structure is selected from the group consisting of: a ring, a disk, an annulus, an arc, and an angle. The angle may be formed, for instance of two non-parallel linear arms that meet at an intersection point. Alternatively, the angle may be formed of two non-parallel linear arms with ends that are joined by an arcuate segment.

It is to be understood that the singular forms "a", "an" and "the" include plural referents unless the context clearly dictates otherwise. The terms "comprising", "having", "including", "entailing" and "containing", or verb tense variants thereof, are to be construed as open-ended terms (i.e., meaning "including, but not limited to,") unless otherwise noted. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure and claims. The present examples are to be considered as illustrative and supportive, rather than restrictive. The intention is to clarify the explanation, and not to limit the scope to a specific detail except as claimed.

The invention claimed is:

1. A method of fabricating a P-N junction in a silicon (Si) structure defining a ring modulator, the method comprising:
    implanting a first dopant species over a first portion of the Si structure including a first edge of the Si structure;
    deep implanting a second dopant species over a second portion of the Si structure including a second edge of the Si structure opposed to the first edge but excluding the first edge, wherein the first portion and the second portion overlap in a central portion of the Si structure between the first edge and the second edge, and wherein the second dopant species is implanted below the first dopant species; and
    shallow implanting the second dopant species over the second portion of the Si structure including the second edge of the Si structure opposed to the first edge but excluding the first edge, wherein the second dopant species is implanted above the first dopant species;
    wherein a first side face adjacent the first edge corresponds to an outer surface of the ring modulator, and a second side face adjacent the second edge corresponds to an inner face of the ring modulator.

2. The method of claim 1, wherein the implanting of the first dopant species and the deep and shallow implanting of the second dopant species is performed at a generally normal angle of incidence to the Si structure.

3. The method of claim 1, wherein the deep implanting and the shallow implanting of the second dopant species are performed such that area predominantly doped with the second dopant species is a single electrically contiguous area.

4. The method of claim 3, wherein the P-N junction comprises a U-shaped P-N junction.

5. The method of claim 1, wherein the implanting of the first dopant species is performed with a first mask extending over, and shielding, the second edge.

6. The method of claim 5, wherein the deep implanting and the shallow implanting of the second species is performed with a second mask extending over, and shielding, the first edge.

7. The method of claim 1, wherein the deep implanting of the second dopant species is performed at a higher energy than the implanting of the first dopant species.

8. The method of claim 1, wherein the deep implanting of the second dopant species is performed at a higher energy than the shallow implanting of the second dopant species.

9. The method of claim 7, wherein the shallow implanting of the second dopant species is performed at a lower energy than the implanting of the first dopant species.

10. The method of claim 7, wherein the shallow implanting of the second dopant species is performed at a same energy as the implanting of the first dopant species.

11. The method of claim 1, wherein the deep implanting of the second dopant species is performed at a higher dose than the implanting of the first dopant species.

12. The method of claim 1, wherein the deep implanting of the second dopant species is performed at a higher dose than the shallow implanting of the second dopant species.

13. The method of claim 1, wherein the deep implanting of the second dopant species is performed at a higher energy than both the implanting of the first dopant species and the shallow implanting of the second dopant species.

14. The method of claim 1, wherein the first dopant species comprises a P-type dopant, and wherein the second dopant species comprises an N-type dopant.

15. The method of claim 1, wherein the first dopant species comprises an N-type dopant, and wherein the second dopant species comprises a P-type dopant.

16. The method of claim 1, wherein the first dopant species comprises boron, and wherein the second dopant species comprises phosphorus.

17. The method of claim 1, wherein the Si structure comprises an optical waveguide.

18. A P-N junction manufactured using the method of claim 1.

19. A Mach-Zehnder interferometer comprising the P-N junction of claim 18.

20. An optical modulator comprising the P-N junction of claim 18.

* * * * *